United States Patent [19]

Blonder

[11] Patent Number: 4,966,433
[45] Date of Patent: Oct. 30, 1990

[54] DEVICE INCLUDING A COMPONENT IN ALIGNMENT WITH A SUBSTRATE-SUPPORTED WAVEGUIDE

[75] Inventor: Greg E. Blonder, Summit, N.J.

[73] Assignee: AT&T Bell Laboratories, Murray Hill, N.J.

[21] Appl. No.: 399,431

[22] Filed: Aug. 23, 1989

Related U.S. Application Data

[63] Continuation of Ser. No. 163,686, Mar. 3, 1988, abandoned.

[51] Int. Cl.[5] ............................................. G02B 6/30
[52] U.S. Cl. .............................. 350/96.17; 350/96.15; 350/96.2
[58] Field of Search ........................ 350/96.11–96.15, 350/96.17, 96.2

[56] References Cited

U.S. PATENT DOCUMENTS

| | | | |
|---|---|---|---|
| 4,165,914 | 8/1979 | Villaruel et al. | 350/96.17 X |
| 4,186,994 | 2/1980 | Denkin et al. | 350/96.17 |
| 4,301,462 | 11/1981 | Lowry | 350/96.17 X |
| 4,461,535 | 7/1984 | Marcatili | 350/96.14 |
| 4,759,595 | 7/1988 | Boord et al. | 350/96.17 X |
| 4,768,199 | 8/1988 | Heinen et al. | 350/96.2 X |
| 4,802,727 | 2/1989 | Stanley | 350/96.15 X |
| 4,828,358 | 5/1989 | Blonder | 350/96.15 |

FOREIGN PATENT DOCUMENTS

| | | | |
|---|---|---|---|
| 56-54081 | 5/1981 | Japan | 350/96.17 |
| 57-158824 | 9/1982 | Japan | 350/96.2 |
| 59-185306 | 10/1984 | Japan | 350/96.11 |
| 2097550 | 11/1982 | United Kingdom | 350/96.18 |

OTHER PUBLICATIONS

*Applied Optics*, vol. 17, No. 6, Mar. 15, 1978, "Optical Coupling from Fibers to Channel Waveguides Formed on Silicon", J. T. Boyd and S. Sriram, pp. 895–898.

*Electronics Letters*, vol. 12, No. 16, Aug. 5, 1976, "Optical Fibers and Channel Waveguides", H. P. Hsu and F. F. Milton, pp. 404–405.

*Applied Optics*, vol. 13, No. 2, Feb. 1974, "Thin-Film Laser-to-Fiber Coupler", L. P. Boivin, pp. 391–395.

*Primary Examiner*—William L. Sikes
*Assistant Examiner*—John Ngo
*Attorney, Agent, or Firm*—Wendy W. Koba

[57] ABSTRACT

In an optical device such as, e.g., an optical communications coupler or an optical gyroscope, a substrate-supported waveguide is aligned with a device component such as, e.g., an optical fiber or a photodetector. Optical alignment of such component relative to the waveguide is facilitated as the component is located in a preferentially etched groove in the substrate supporting the waveguide. In the case of an optical fiber connection, optical coupling is facilitated by a ledge structure overhanging a sloping etched wall of a groove holding the fiber. In the case of a photodetector, an etched groove may be essentially perpendicular to the direction of light propagation.

12 Claims, 4 Drawing Sheets

DEVICE INCLUDING A COMPONENT IN ALIGNMENT WITH A SUBSTRATE-SUPPORTED WAVEGUIDE

This application is a continuation of application Ser. No. 07/163,686, filed on Mar. 3, 1988 now abandoned.

TECHNICAL FIELD

The invention is concerned with devices including a substrate-supported optical waveguide.

BACKGROUND OF THE INVENTION

Originating, for practical purposes, with the development of inexpensive, low-loss optical fiber waveguides, optical communications technology has become well-established especially in long-distance, "inter-exchange" communications. More recently, interest has been growing in bringing optical signals closer to their ultimate destination such as, e.g., individual subscriber telephones, facsimile terminals, and data-processing equipment. In a primary field of application, namely the so-called local loop, it is desired to bring single-mode optical signals to the subscriber. And, in so-called local-area networks (LAN), multi-mode signals are being used in communications over relatively short distances such as, e.g., internal to a building or plant.

While, in long-distance communications, the cost of the fiber transmission medium is determinative of commercial feasibility, the total cost of local applications is dominated by the cost of components such as, e.g., optical sources, detectors, connectors, and couplers. Thus, the commercial feasibility of optical communications in local situations depends largely on the availability of low-cost optical components and on inexpensive ways of connecting components to optical fibers. Considered as particularly desirable in this respect are inexpensive means for connecting optical fibers and other optical components to substrate-supported waveguides, proper alignment of a component relative to the waveguide being a primary concern in such connections. For earlier work in this field see, e.g., L. P. Boivin, "Thin-Film Laser-to-Fiber Coupler", *Applied Optics*, Vol. 13 (1974), pp. 391–395;

H. P. Hsu et al., "Optical Fibers and Channel Waveguides", *Electronics Letters*, Vol. 12 (1976), pp. 404–405; and J. T. Boyd et al., "Optical Coupling from Fibers to Channel Waveguides Formed on Silicon", *Applied Optics*, Vol. 17 (1978), pp. 895–898.

SUMMARY OF THE INVENTION

The invention is a device in which at least one optical component (such as, e.g., an optical fiber or a photodetector diode) is in preferred alignment with a substrate-supported waveguide, such alignment being defined as axial, collinear, facing, perpendicular, or in terms of any other suitable specification of relative position. Preferred, in accordance with the invention, are essentially single-crystal substrates amenable to crystallographically preferential etching; particularly convenient is the use of a silicon substrate. Alignment is facilitated by a preferentially etched groove such as, typically, a V-groove.

In the case of an optical fiber connection, such groove undercuts a waveguide so as to permit butt coupling of a fiber against a ledge or lip which overhangs a sloping etched surface. (Butt coupling is understood as being across a fiber-waveguide distance not exceeding fiber mode diameter, such diameter being approximately equal to fiber core diameter).

DETAILED DESCRIPTION

The following description is in terms of a preferred embodiment in which a thin-film waveguide is supported by a silicon substrate, a layer of silicon dioxide serving as an optical cladding between the waveguide proper and the silicon substrate, and a layer of deposited silicon dioxide completing the cladding structure. Manufacture of such preferred structure is facilitated by processing involving layer deposition and patterning as disclosed in further detail in a patent application designated as C. H. Henry - R. A. Levy 8-12, "Device Including a Substrate-supported Optical Waveguide, and Device Manufacture".

Figure 1:
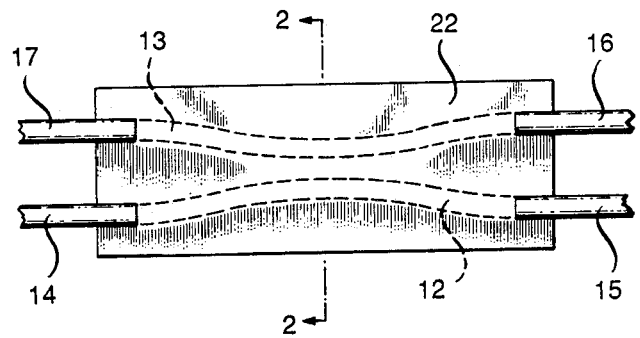
FIG. 1 is a schematic top view of an optical coupler as a preferred embodiment of the invention and as including four instances of a fiber aligned with a thin-film waveguide.

FIG. 1 shows silica-covered silicon substrate 22, thin-film waveguides 12 and 13 disposed on the substrate and beneath the silica cover layer, and optical fibers 14, 15, 16, and 17 aligned with waveguides 12 and 13 as placed in etched V-grooves in the substrate.

Figure 2:
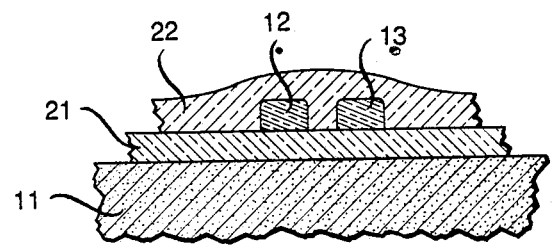
FIG. 2 is a schematic cross-sectional view of the coupler of FIG. 1.

FIG. 2 shows silicon substrate 11, silicon dioxide layer 21, waveguides 12 and 13, and silica cover layer 22. Layers 21 and 22 serve as optical cladding layers. The material of the higher-index waveguide material may be phosphosilicate glass. For optical radiation at a wavelength of 1.3 micrometer, preferred dimensions are as follows: A thickness of approximately 10 to 15 micrometers for silicon dioxide layer 21, a width of approximately 5 micrometers for the waveguides 12 and 13, center-to-center spacing of approximately 7 to 8 micrometers between waveguides 12 and 13 (this in the interest of effective evanescent-field coupling between side-by-side waveguides 12 and 13), and a thickness of approximately 5 micrometers for cover layer 22.

Figure 3:
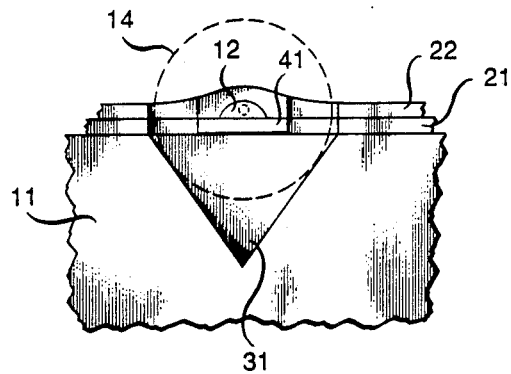
FIG. 3 is a schematic end view of one of the four fiber connections to the coupler of FIG. 1.

FIG. 3 shows silicon substrate 11 with V-groove 31, silicon dioxide layer 21, waveguide 12, and silica cover layer 22. As indicated by a broken circular line, and as more explicitly depicted in FIG. 5, fiber 14 is positioned such that the fiber core portion is aligned with waveguide 12.

Etching of grooves involves, first, etching straight through the glass-layer waveguide structure, and then, by anisotropic etching, forming of a V-groove in the silicon substrate. Conveniently, etching through the glass layer structure is by means of reactive ion etching in the presence of a chromium mask layer which subsequently also serves as mask layer during preferential etching, e.g., by means of a potassium hydroxide solution.

Fastening of an optical fiber in a V-groove preferably involves glass-to-glass or metal-to-metal contact, the latter being preferred for fiber attachment by soldering, e.g., between chromium-coated fiber and V-groove surfaces. Alternatively, index-matching epoxy or silicon rubber can be used for fastening of the fiber in a V-groove. Another concern in connection with glass fiber touching V-groove sidewalls is with fiber strength, and fiber surface roughening by so-called orange-peel etching may be used to advantage in this respect.

Figure 4:
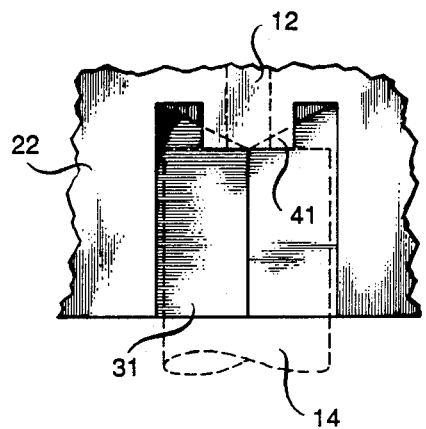
FIG. 4 is a schematic top view of the fiber connection of FIG. 3.
Figure 5:
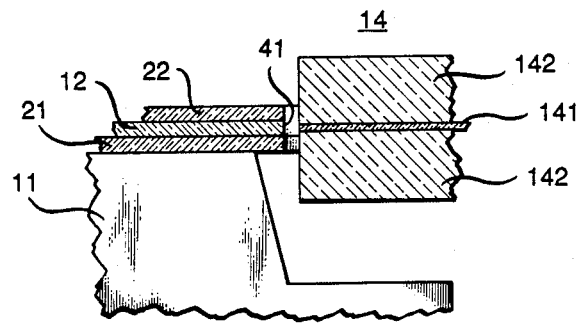
FIG. 5 is a schematic cross-sectional view of the connection of FIG. 3, the cross section being perpendicular to the substrate and perpendicular also to the cross section of FIG. 2.

FIGS. 4 and 5 illustrate preferred fiber-to-waveguide coupling in accordance with the invention, such coupling being facilitated by a ledge overhanging a sloping end surface of an etched groove, thereby overcoming a difficulty noted in the paper by L. P. Boivin as cited above. Specifically, FIG. 4 shows silica-covered silicon substrate 22 with V-groove 31, waveguide 12 beneath the silica cover, and the position of optical fiber 14. Specifically shown is a ledge 41 as formed by undercut etching of silicon while the waveguide structure is left intact.

FIG. 5 shows silicon substrate 11, silicon dioxide layer 21, waveguide 12, cover layer 22, and fiber 14 with core portion 141 and cladding portion 142. The ledge portion 41 is as described above with respect to FIG. 4. Though not shown, use of an index-matching substance in a gap between the fiber and the waveguide is not precluded.

While, in FIGS. 4 and 5, fiber 14 is shown as having a face which is essentially perpendicular to the fiber axis, a fiber may alternatively terminate in a taper, further facilitating butt coupling. Preferably, however, at least the core portion of the fiber terminates in a surface essentially perpendicular to the fiber axis. In either case, alignment in accordance with the invention does not require consideration of the azimuth of a fiber in fiber placement as is the case, e.g., where butting depends on an angled fiber face. (Azimuthal freedom of the invention may be used to advantage, e.g., in the preferred placement of a polarization-preserving fiber.)

Figure 6:
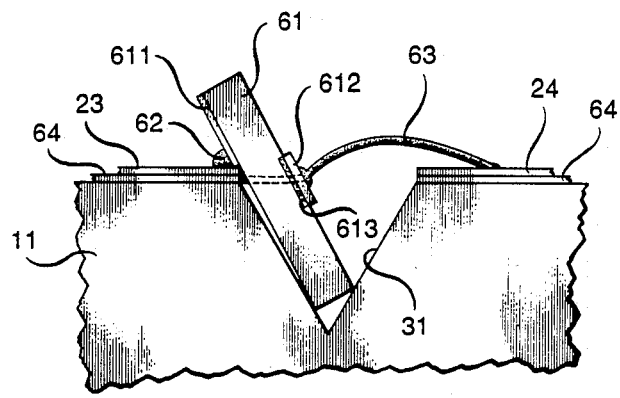
FIG. 6 is a schematic cross-sectional view of a detector device as a preferred embodiment of the invention, optical coupling being from a thin-film waveguide to a photodetector diode.

FIG. 6 shows substrate 11 with groove 31, waveguide structure 64 including a waveguide between cladding layers, metallization layer 23, and photodetector diode 61 with contact metallization layers 611 and 612, and light-sensitive region 613. The photodetector diode 61 is shown resting against a sidewall of groove 31 whose location, depth, and length are chosen so as to provide positive, passive alignment of region 613 with light emanating from waveguide 64. Metallization layers 23 and 611 are connected by solder 62, and a so-called flying-wire bond 63 connects contact layers 24 and 612. Broken lines show the light path.

Figure 7:
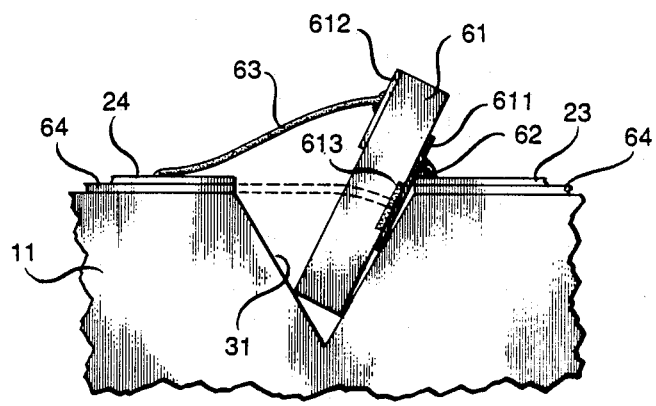
FIG. 7 is a schematic cross-sectional view of a detector device representing a preferred embodiment alternative to the embodiment of FIG. 5.

FIG. 7 shows the same features as FIG. 6, adapted for positioning of the photodetector diode against the opposite sidewall of the groove. While, in the arrangement of FIG. 6, photodetector diode 61 is butt coupled to the waveguide structure 64, FIG. 7 illustrates optical coupling across a significant distance. In both cases, and unlike axial fiber-waveguide alignment, alignment is facilitated by an etched groove oriented with a significant component perpendicular to the waveguide direction.

Figure 8:
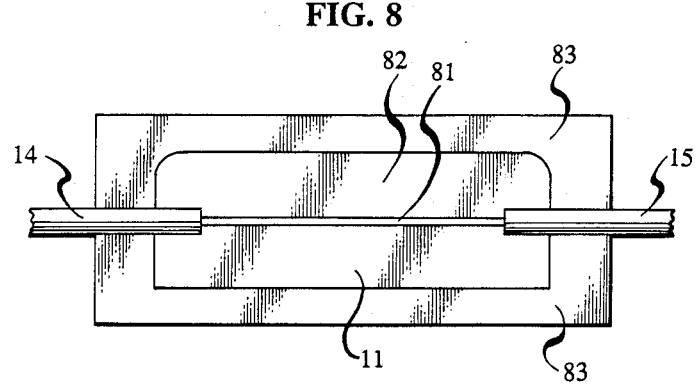
FIG. 8 is a schematic cross-sectional view of a device of the invention as included in a molded package.

FIG. 8 shows silicon substrate 11, waveguide structure 81 on substrate 11, optical fibers 14 and 15, silicone rubber 82, and molded encapsulation 83

Figure 9:
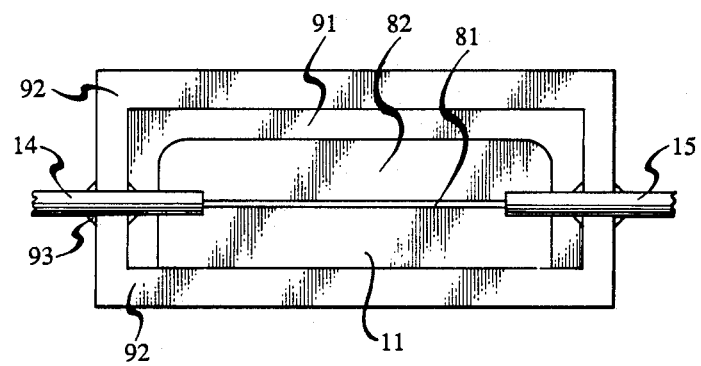
FIG. 9 is a schematic cross-sectional view of a device of the invention as included in a ceramic package.

FIG. 9 shows silicon substrate 11, waveguide structure 81 on substrate 11, optical fibers 14 and 15, silicone rubber 82, airspace 91, ceramic encapsulation 92, and glass seals 93 between encapsulation 92 and optical fibers 14 and 15.

Figure 10:
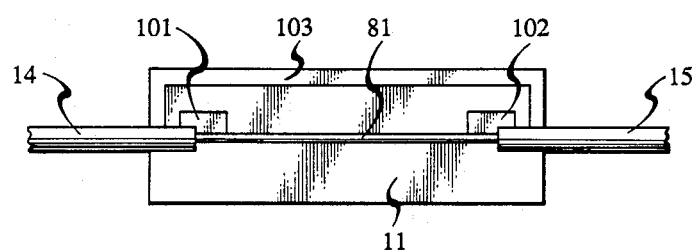
FIG. 10 is a schematic cross-sectional view of a device of the invention as included in a silicon package.

FIG. 10 shows silicon substrate 11, waveguide structure 81 on substrate 11, optical fibers 14 and 15, fastening blocks 101 and 102, and silicon lid 103.

While described above in terms of a preferred embodiment based on silicon technology, the invention includes embodiments as based on other substrate materials such as, e.g., Group III-V and Group II-VI semiconductor materials for which anisotropically acting etchants are available. Preferred substrates are single-crystal or essentially single-crystal in the sense that crystallographic dislocations and other imperfections may be tolerated so long as they do not interfere with the production of a desired groove by preferential etching. While, for the sake of aligning fibers in V-grooves, substrate orientation is preferably (100), other substrate orientations are not precluded. For example, (110) orientation results in preferential etching of grooves having vertical walls as may be preferred for the aligned placement of photodetectors and light sources.

I claim:

1. A device comprising a thin-film optical waveguide permanently deposited on and supported by an essentially single-crystal substrate, and an optical fiber axially aligned with said waveguide,
    alignment being as resulting upon placement of said optical fiber in a preferentially etched groove in said substrate,
    characterized in that said groove undercuts said waveguide for a distance which is sufficient to permit optical butt coupling between said waveguide and said fiber, butt coupling being defined as resulting either in physical contact between said waveguide and said fiber or in a distance between said waveguide and said fiber which is less than a mode diameter of said fiber.

2. The device of claim 1, said optical fiber terminating in a surface which, at least across a core region of said fiber, is essentially perpendicular to the fiber axis.

3. The device of claim 2, said fiber terminating in a taper.

4. The device of claim 1 in which said substrate is a (100)-silicon substrate.

5. The device of claim 1 in which said groove is a V-groove.

6. The device of claim 1, said waveguide being undercut so that thin-film portions adjacent to said waveguide are etched back essentially to the same extent as said groove.

7. A device comprising a thin-film optical waveguide permanently deposited on and supported by an essentially single-crystal substrate, and an optical component aligned with said waveguide in an optical coupling relationship, alignment being as resulting upon placement of said optical component in a preferentially etched groove in said substrate, said groove defined as including a significant transverse component and a minor width component characterized in that said groove is oriented with said significant component perpendicular to the optical waveguide direction.

8. The device of claim 7, said component being a light detector.

9. The device of claim 7, said groove being a V-groove.

10. The device of claim 7, said groove being a vertical groove.

11. The device of claim 7, said component being in butt-coupling relationship with said waveguide.

12. The device of claim 7, optical coupling between said waveguide and said component being across a significant distance.

* * * * *